April 18, 1967    V. F. PUNGITORE    3,314,572

DISPENSED LIQUID HEATING DEVICE

Filed Dec. 31, 1964

INVENTOR
VINCENT F. PUNGITORE
BY
Curtis, Morris & Safford
ATTORNEYS

United States Patent Office 3,314,572
Patented Apr. 18, 1967

3,314,572
DISPENSED LIQUID HEATING DEVICE
Vincent F. Pungitore, 945 E. 214th St.,
Bronx, N.Y. 10469
Filed Dec. 31, 1964, Ser. No. 422,764
3 Claims. (Cl. 222—136)

This invention relates to devices and methods for heating materials dispensed from a pre-pressurized container; more particularly, this invention relates to devices and methods for heating and treating shaving lather as it is dispensed from a pre-pressurized container.

It long has been desired to provide a simple attachment for shaving lather "bombs" or containers which would heat the lather so as to make it more comfortable when spread on the face and increase the beard-softening action of the lather. Some devices which have been proposed in the past for this purpose have been too expensive. Others have large heating coils which must be held under hot water for relatively long periods of time, thus making them inconvenient and slow to use.

Accordingly, an object of the present invention is to provide a device and method for heating materials as they are dispensed from a pre-pressurized dispenser.

Another object of the present invention is to provide such a device which is easily attached to a shaving lather dispenser, and is simple, inexpensive to manufacture, and very quick and easy to use.

Still another object of the present invention is to provide such a device and method which increase the beard-softening properties of the later beyond the enhanced properties attained by heating the lather.

The drawings and description that follow describe the invention and indicate some of the ways in which it can be used. In addition, some of the advantages provided by the invention will be pointed out.

Figure 1:
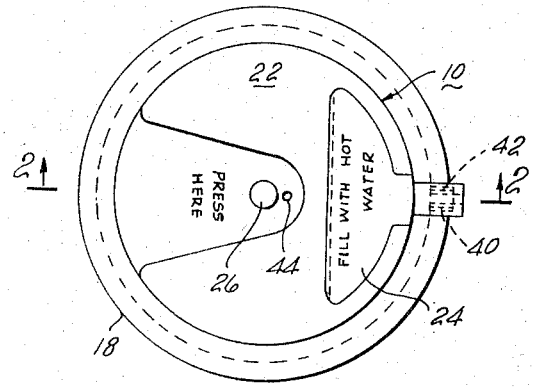
FIGURE 1 is a plan view of a lather dispensing and heating device constructed in accordance with the present invention.

The devices shown in the drawings are intended for use primarily in heating and treating shaving lather as it is dispensed from a pre-pressurized container. However, it should be understood that the invention can be utilized equally well for heating and mixing other types of materials which are stored and emitted from such pre-pressurized containers.

Figure 2:
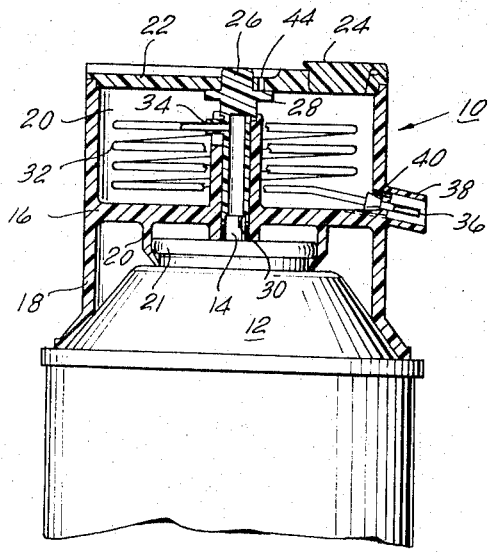
FIGURE 2 is a cross-sectional view taken along line 2—2 of FIGURE 1.

Referring now to FIGURES 1 and 2, the heating and mixing device 10 of the present invention comprises a cap attachment for an ordinary commercially-available pre-pressurized shaving lather dispensing container 12. Container 12 has an outlet spout 14 which may be depressed to actuate a spring-return valve in container 12 to dispense shaving lather from the spout 14.

The cap 10 includes a housing 16 with an outer support wall 18 and an inner wall 20 which advantageously snaps onto the rim 21 of can 12 to fasten the unit 10 in place on the can.

Housing 18 forms a compartment 20 which has a cover 22 secured to the top of the housing 18. Cover 22 has a hinged lid or plug 24 which closes a hole in the cover. Lid 24 can be lifted so as to open the compartment 20 for filling it with liquids.

The upper end of a valve stem 26 protrudes upwardly through a hole in cover 22. A flange 28 is thrust upwardly against the lower surface of cover 22 under the thrust of the spring of the valve in container 12. Valve stem 26 has a hollow central portion and a lower shoulder 30 which abuts against the upper edge of spout 14. By depressing valve stem 26, the operator causes shaving lather to be dispensed from spout 14 and upwardly through the hollow center of the valve stem 26.

A very thin-walled coiled plastic tube 32 is connected to the hollow central portion of valve stem 26 at one end 34 of the tube. The other end 36 of tube 32 passes through a wall of housing 16 and out of the housing 16 through a lather spout 38.

A pair of small holes 40 and 42 lead from the water compartment 20 into the lather spout 38. Also, an air vent hole 44 is provided in the cover 22. Air vent 44 normally is closed by the flange 28 on valve stem 26 and liquid will not flow from compartment 20. However, when the valve stem 26 and flange 28 are depressed, air vent 44 is opened, thus allowing air to replace liquid lost from the compartment 20, and liquid flows freely from the compartment 20 through holes 40 and 42 and mixes in spout 38 with the lather issuing from the end 36 of tube 32.

The above-described heating device 10 is used in the shaving lather heating and wetting method of the present invention as follows: The user lifts up lid 24, and allows hot water from an ordinary household faucet to run into the compartment 20, and then closes lid 24. He then may immediately depress valve stem 26 and hot, wet lather issues from the spout 38. The lather is heated by the water in the compartment 20 through the walls of coiled tube 32, and is further heated by the water that is mixed with it in the spout 38. Moreover, the hot water which is mixed with the lather makes it "wetter," thus speeding and improving its "beard-softening" action, and readies the beard for shaving much more rapidly than ordinary dispensed lathers.

Figure 3:
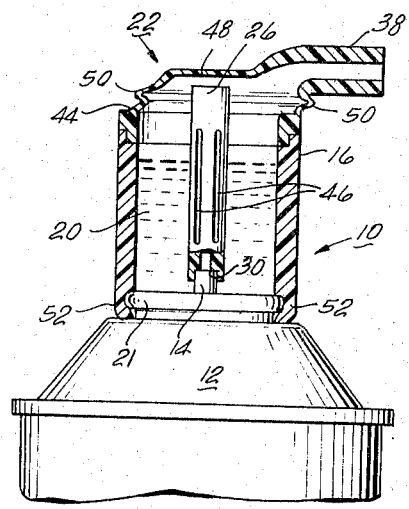
FIGURE 3 is a cross-sectional view of another embodiment of the present invention.

Another embodiment of the heating and mixing device 10 is illustrated in FIGURE 3. This embodiment is the same as that shown in FIGURES 1 and 2 except that the lather passes directly through the hot water in the compartment 20 for heating and mixing rather than flowing through the tube 32 first. Also, the lather spout 38 is made a part of the cover 22.

The valve stem 26 is a hollow tube with four or more longitudinal slots 46. The cover 22 can be releasably snapped onto the housing 16 (which in this case forms the walls of the compartment 20) so that it may be removed to allow the user to fill the compartment. The cover 22 has an upper flat portion which is made of flexible material, and has side-walls 50 of flexible material formed into "accordion" pleats. When the user presses on the flat portion 48, his finger contacts the top of valve stem 26 and depresses it to release lather from spout 14. The lather travels through the slots 46 in stem 26, mixes with the water in the compartment, and then rises up to and is ejected from the spout 38. When a satisfactory amount of lather has thus been dispensed, the user releases the valve stem and the resilient sides 50 and flat portion 48 of the cover 22 cause the cover 22 to return to the original shape shown in FIGURE 3. This creates a vacuum in the device 10 which causes foam in the spout 38 to be drawn or retrieved back into the cover housing so that the foam will not ooze out of the spout. If the device 10 is tipped so that the spout 38 points downwadrly, additional hot water will be dispensed from compartment 20 along with the lather emerging from spout 38. In this respect, then, the amount of water mixed with the lather can be controlled by the user. The air-vent 44 is placed opposite spout 38 and its diameter is made relatively small so that it will provide ample air to replace liquid and foam lost from compartment 20 but will not seriously affect the foam-retrieval properties of the device.

Since the walls of the housing 16 form the walls of the water compartment 20, it is desirable that a tight fit be formed between the rim 21 of the container 12 and the flexible lower edge 52 of the housing 16.

Figure 4:
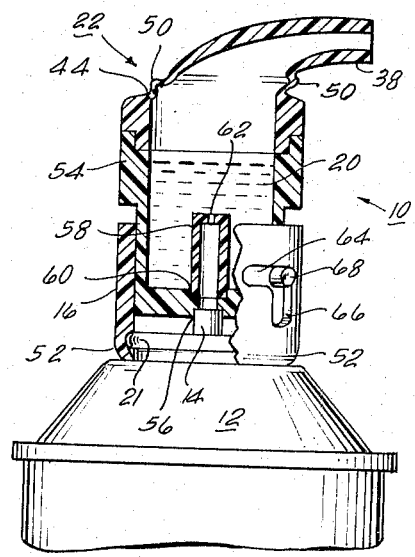
FIGURE 4 is a cross-sectional view, partially broken away, of another embodiment of the present invention.

The device shown in FIGURE 4 is another embodiment of the present invention. The device 10 shown in FIGURE 4 includes an outer housing 16 which is snapped onto the rim 21 of the container 12. However, the compartment 20 is formed by a separate piston-like unit 54 which slides vertically within housing 16. The container spout 14 is inserted into a recess 56 in the bottom wall of unit 54. A nozzle 58 is force-fitted into another recess 60 in the bottom wall of unit 54 and has a hollow interior which communicates with spout 14. Nozzle 58 has a small-diameter (e.g. 0.035 inch) pin-hole exit opening 62.

Housing 16 has an inverted L-shaped slot with a horizontal portion 64 and a vertical portion 66. A projection 68 is secured to the exterior of unit 54 and is fitted into the L-shaped slot. The cover 22 is the same as the cover in FIGURE 3 except that it does not have the flat portion 48.

The device 10 shown in FIGURE 4 operates as follows: The user rotates unit 54 until pin 68 is located in the horizontal portion 64 of the L-shaped slot in housing 16. He then lifts the cap 22 off, fills the compartment 20 with hot water, and then presses down on cap 22 to snap it back into place. Since projection 68 is not in the horizontal portion 64 of the L-shaped slot, pressing down on cap 22 does not actuate the lather dispensing mechanism.

The user then rotates unit 54 until projection 68 is in the vertical portion 66 of the L-shaped slot. He then presses downwardly on cap 22 again, and hot, wet lather emerges from spout 38. The downward pressure on cap 22 is transmitted through structure 54 to container spout 14 which dispenses pressurized lather into nozzle 58. The lather issues in a high-speed stream from orifice 62 into the hot water in compartment 20 where it is mixed thoroughly with the water and then emerges from the spout 38. When the user releases cap 22, the resiliency of the accordion pleats 50 draws some of the foam in the spout 38 back into the heating device 10 in the manner described above. The use of the nozzle 58 is optional and may be omitted if desired.

The above-described embodiments of the invention preferably are made of plastic such as polyethylene. However, other suitable materials may be used.

The lather heating and wetting device and method described above operate rapidly, are easy to use, and provide an extremely "wet" lather for rapid softening of the beard.

The above description of the invention is intended to be illustrative and not limiting. Various changes or modifications in the embodiments described may occur to those skilled in the art and these can be made without departing from the spirit or scope of the invention as set forth in the claims.

I claim:

1. A device for heating and mixing with hot water shaving lather as it is selectively dispensed from a pre-pressurized container by the selective depression of a spring-return container valve connected to a container spout, said device comprising, in combination, a hot water chamber having a cover releasable for admitting hot water into it, a valve stem connected to said container spout and depressable from the exterior of said chamber to actuate said container valve, said valve stem having a hollow portion communicating with said container spout, a length of relatively thin-walled tubing coiled in said chamber and connected to said hollow portion, said tubing exiting from said chamber in a lather spout, a hole in said chamber exiting into said lather spout so as to guide hot water from said chamber to mix with lather in said spout, an air vent in a wall of said chamber, said air vent normally being closed by said valve stem but being opened by depression of said valve stem, and means for securing said device onto said container.

2. A device for heating and mixing with hot water shaving lather as it is selectively dispensed from a pre-pressurized container by the selective depression of a spring-return container valve connected to a container spout, said device comprising, in combination, a hot water chamber having a cover releasable for admitting hot water into it, valve means connected to said container spout and depressable from the exterior of said chamber to actuate said container valve, said valve means having a hollow portion communicating with said container spout, a length of relatively thin-walled tubing coiled in said chamber and connected to said hollow portion, said tubing exiting from said chamber in a lather spout, a hole in said chamber exiting into said lather spout so as to guide hot water from said chamber to mix with lather in said spout, and means for securing said device onto said container.

3. Apparatus for heating and mixing with a heating liquid materials dispensed from a pre-pressurized container through a container spout by the depression of said spout to actuate a container materials release valve, said apparatus comprising, in combination, chamber means including a chamber for receiving said materials as they issue from said container, said chamber having a cover which can be opened to admit a hot liquid into said chamber, an opening for issuing said materials from said chamber means after they have been heated and mixed with said hot liquid, said chamber means also including a valve stem connected to said container spout and extending vertically into said chamber and up to a position adjacent the top of said chamber so as to be depressable from the exterior of said chamber to actuate said container valve, said valve stem having a hollow portion communicating with said container spout, and a plurality of longitudinally-extending slots communicating between said hollow portion and the exterior of said valve stem so as to deliver said materials through said openings into said hot liquid in said chamber.

References Cited by the Examiner

UNITED STATES PATENTS

| | | | |
|---|---|---|---|
| 3,144,174 | 8/1964 | Abplanalp | 222—146 |
| 3,175,733 | 3/1965 | Lerner | 222—146 |
| 3,217,937 | 11/1965 | Kasparian | 222—146 |
| 3,217,938 | 11/1965 | Ayres | 222—146 |

ROBERT B. REEVES, *Primary Examiner.*

HADD S. LANE, *Examiner.*